(12) United States Patent
Nikola et al.

(10) Patent No.: US 12,218,562 B2
(45) Date of Patent: Feb. 4, 2025

(54) ELECTRIC MOTOR WITH PRINTED CIRCUIT BOARD

(71) Applicant: SEW-EURODRIVE GMBH & CO. KG, Bruchsal (DE)

(72) Inventors: Joachim Nikola, Kraichtal (DE); Martin Melzer, Karlsruhe (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 460 days.

(21) Appl. No.: 17/767,593

(22) PCT Filed: Sep. 11, 2020

(86) PCT No.: PCT/EP2020/025407
§ 371 (c)(1),
(2) Date: Apr. 8, 2022

(87) PCT Pub. No.: WO2021/069093
PCT Pub. Date: Apr. 15, 2021

(65) Prior Publication Data
US 2023/0253854 A1    Aug. 10, 2023

(30) Foreign Application Priority Data

Oct. 8, 2019   (DE) .......................... 102019006990.0

(51) Int. Cl.
*H02K 5/22*    (2006.01)
*H02K 3/30*    (2006.01)
(Continued)

(52) U.S. Cl.
CPC .............. *H02K 5/225* (2013.01); *H02K 3/30* (2013.01); *H02K 3/345* (2013.01); *H02K 5/02* (2013.01);
(Continued)

(58) Field of Classification Search
CPC ............ H02K 5/225; H02K 5/22; H02K 5/02; H02K 5/04; H02K 11/33; H02K 11/30; H02K 11/25; H02K 3/30; H02K 3/345
See application file for complete search history.

(56) References Cited

U.S. PATENT DOCUMENTS 7,445,081 B2 * 11/2008 Tominaga .............. H02K 11/33
                                                          180/444
8,866,357 B2  10/2014 Yamasaki
(Continued)

FOREIGN PATENT DOCUMENTS

DE    102006043194 A1    10/2007
DE    102010005767 A1    7/2011
(Continued)

OTHER PUBLICATIONS

International Search Report issued in corresponding International Application No. PCT/EP2020/025407 dated Dec. 3, 2020, pp. 1-2, English Translation.
(Continued)

*Primary Examiner* — Nguyen Tran
(74) *Attorney, Agent, or Firm* — Carter, DeLuca & Farrell LLP

(57) ABSTRACT

An electric motor includes a first printed circuit board having layers with conductor tracks. The layers are spaced apart from one another by first layers of insulating material, for example, fiber-reinforced plastic, e.g., an epoxy material, and an insulating layer is arranged between two of the layers.

23 Claims, 5 Drawing Sheets

(51) Int. Cl.
*H02K 3/34* (2006.01)
*H02K 5/02* (2006.01)
*H02K 11/33* (2016.01)
*H02K 16/04* (2006.01)

(52) U.S. Cl.
CPC ............. *H02K 11/33* (2016.01); *H02K 16/04* (2013.01); *H02K 2211/03* (2013.01)

(56) References Cited

U.S. PATENT DOCUMENTS

| | | | |
|---|---|---|---|
| 10,554,100 B2* | 2/2020 | Hamada | ................. H02K 9/227 |
| 2010/0314192 A1 | 12/2010 | Shigeki | |
| 2012/0033385 A1 | 2/2012 | Hideo | |
| 2013/0221811 A1* | 8/2013 | Uchida | ................ H05K 1/0203 |
| | | | 310/68 R |
| 2013/0301229 A1 | 11/2013 | Takuya | |
| 2013/0315752 A1* | 11/2013 | Blaser | ....................... G05D 9/12 |
| | | | 417/45 |
| 2015/0008768 A1* | 1/2015 | Achterberg | ............ B65G 54/02 |
| | | | 310/12.11 |
| 2016/0248294 A1* | 8/2016 | Horng | ....................... H02K 7/14 |
| 2017/0163122 A1* | 6/2017 | Sturm | ................ H05K 7/20145 |
| 2021/0268644 A1* | 9/2021 | Takagi | ........................ B25J 9/06 |

FOREIGN PATENT DOCUMENTS

| | | |
|---|---|---|
| DE | 102011056365 A1 | 7/2012 |
| DE | 102013006539 A1 | 11/2013 |
| DE | 102018100139 A1 | 7/2019 |
| EP | 2635096 A1 | 9/2013 |
| JP | 2017224761 A | 12/2017 |
| WO | 2009069103 A2 | 6/2009 |
| WO | 2017158966 A1 | 9/2017 |

OTHER PUBLICATIONS

International Report on Patentability issued in corresponding International Application No. PCT/EP2020/025407 dated Apr. 12, 2022, pp. 1-9, English Translation.

* cited by examiner

ELECTRIC MOTOR WITH PRINTED CIRCUIT BOARD

FIELD OF THE INVENTION

The invention relates to an electric motor with a printed circuit board.

BACKGROUND INFORMATION

In certain conventional systems, an electric motor generates waste heat and high temperatures can occur as a result.

An electric power steering device is described in German Patent Document No. 10 2006 043 194.

A method for producing a multilayered circuit board is described in German Patent Document No. 10 2018 100 139.

A control unit is described in U.S. Patent Application Publication No. 2013/0301229.

A drive unit is described in German Patent Document No. 10 2011 056 365.

A vehicle control is described in U.S. Patent Application Publication No. 2010/0314192.

A production method for an electric motor is described in PCT Patent Document No. WO 2009/069103.

An electrical device with a cooling arrangement is described in German Patent Document No. 10 2013 006 539.

SUMMARY

Example embodiments of the present invention provide an electric motor with integrated electronics.

According to an example embodiment of the present invention, an electric motor includes a first printed circuit board has layers with conductor tracks, the layers are spaced apart from one another by first layers of insulating material, e.g., fiber-reinforced plastic, epoxy material, etc., and an insulating layer is arranged between two of the layers.

The advantage is that production is made readily possible, although it creates an insulating layer, which acts as a heat barrier effective between the two sides of the first printed circuit boards.

According to example embodiments, the insulating layer has a greater layer thickness than the first layers. The advantage is that a strong thermal barrier effect can be achieved.

According to example embodiments, the insulating layer is made from the same material as the first layers, e.g., such that the first printed circuit board is arranged as a multilayered printed circuit board, the layers of which are not uniformly, e.g., regularly, spaced apart, e.g., the material being fiber-reinforced plastic, for example, an epoxy material. The advantage is that production is made readily possible.

According to example embodiments, the insulating layer is made of a different material than the first layers. For example, the material of the insulating layer is a plastic material, which, e.g., has enclosed gas bubbles, for example, gas volumes. The advantage is that an insulating layer can be used, which is made of a material, which has a heat conduction, which is even lower than the one of the other material of the first printed circuit board, which is arranged between the layers.

According to example embodiments, the electric motor has a stator housing, in which the stator winding of the electric motor is accommodated, and a cover part and a retaining ring, which is arranged between the cover part and the stator housing and in which the first printed circuit board is accommodated. The advantage is that a spatial region for electronics, e.g., for an inverter, can be integrally arranged within the motor.

According to example embodiments, the first printed circuit board and second printed circuit boards are arranged in a spatial region of the electric motor, which spatial region is delimited, e.g., enclosed, by the stator housing, the retaining ring and the cover part. The advantage is that the electronics are arranged in a protected manner within the spatial region.

According to example embodiments, the first and the second printed circuit boards are aligned parallel to one another and spaced apart from one another. For example, the axis of rotation of the rotatably mounted rotor shaft of the electric motor is aligned parallel to the normal direction of the first printed circuit board. The advantage is that electrical insulating distances can be maintained and that air is arranged between the second printed circuit boards. The spatial region is filled with air and air circulation can therefore be carried out.

According to example embodiments, the second printed circuit boards are arranged on the side of the first printed circuit board facing away from the stator housing. The advantage is that the second printed circuit boards can be exposed to a lower temperature than the power module and/or the stator winding of the electric motor.

According to example embodiments, the first circuit board is arranged between the stator housing part and the second circuit boards. The advantage is that the first printed circuit board has power electronics on the side facing the stator housing part and has signal electronics on the side facing away from the stator housing part, which signal electronics generates the control signals for the controllable semiconductor switches of the power module. Signal electronics can also be arranged on the second printed circuit boards.

According to example embodiments, a power module that is connected to the stator housing part in a thermally conductive manner is fitted on the side of the first printed circuit board that faces the stator housing part. The advantage is that heat can be dissipated to the environment together with the waste heat generated by the stator winding.

According to example embodiments, the power module, and, for example, the components mounted on the first printed circuit board on the side of the first printed circuit board facing the stator housing part, can be operated up to a first temperature, i.e., the first temperature is the maximum permissible operating temperature for the power module. The components mounted on the first printed circuit board on the side of the first printed circuit board facing away from the stator housing part and the components mounted on the second printed circuit boards can be operated up to a second temperature, i.e., the second temperature is the maximum permissible operating temperature for these components. The second temperature is lower, e.g., at least by more than 10° C. lower, than the first temperature. The advantage is that the signal electronics can be operated at a lower temperature level and can be cooled separately towards the environment.

According to example embodiments, the second printed circuit boards are accommodated in the cover part. The advantage is that the cover part with the second printed circuit boards can be pre-completed and then connected to the retaining ring together with the first printed circuit board. The electronics region can thus be connected to the stator housing part during assembly. Alternatively, however, the first printed circuit board can be fastened to the stator housing part, e.g., screwed on by screws, before the pre-completed cover part with the second printed circuit boards arranged therein is pushed onto the retaining ring. The power module can thus already be pressed against the stator housing part when the first printed circuit board is being fastened, and heat-conducting paste can be arranged between the power module and the stator housing part in order to improve the heat transfer.

According to example embodiments, the first printed circuit board is connected to the second printed circuit board closest to the first printed circuit board by an electrical plug connection, each second printed circuit board being connected to the next closest second printed circuit board by a respective electrical plug connection. The advantage is that of ready production.

According to example embodiments, the retaining ring is made in one piece or in several pieces. The advantage is that the printed circuit board can either be clamped between two pieces or, in the case of a one-piece arrangement, can be pressed against a step of the retaining ring.

According to example embodiments, the retaining ring is sealingly connected to the stator housing part by an interposed seal which also functions as a thermal barrier. The advantage is that the thermal separation of the signal electronics from the power electronics can be improved.

According to example embodiments, the retaining ring is sealingly connected to the cover part by an interposed seal which also functions as a thermal barrier. The advantage is that the thermal separation of the signal electronics from the power electronics can be improved.

According to example embodiments, a fan is arranged in the spatial region. For example, each of the second printed circuit boards has two axially continuous recesses, which are, e.g., diametrically opposed with respect to the axis of rotation of the rotor shaft. The advantage is that a circulating air flow can be conveyed through the spatial region with as little disruption as possible.

According to example embodiments, the stator housing part, the retaining ring and the cover part are made of metal, e.g., as cast parts. For example, the cover part has cooling ribs on its outer side. The advantage is that the thermal conductivity and thus the efficiency of heat dissipation to the environment is high.

Further features and aspects of example embodiments of the present invention are explained in more detail in more detail below with reference to the appended schematic Figures.

DETAILED DESCRIPTION

As shown in FIGS. 1, 2, 4, and 5, the printed circuit board 40 has a plurality of layers 1 with conductor tracks, the layers being spaced apart from one another by layers of insulating material 2, for example, fiber-reinforced plastic, e.g., an epoxy material.

An insulating layer 3 is applied between two of the layers, which, for example, is made of the same material as the layers, e.g., such that the printed circuit board 40 corresponds to a multilayered printed circuit board, whose layers 1 are not evenly spaced from one another. The material is therefore fiber-reinforced plastic, e.g., an epoxy material.

The insulating layer 3 is thicker, i.e., has a greater wall thickness, than the other layers.

Alternatively, the insulating layer 3 is made of a different material than the layers. A suitable material for the insulating layer 3 is a plastic that has enclosed gas bubbles, e.g., gas volumes.

In both configurations, the insulating layer 3 acts as a thermal barrier.

Figure 1:
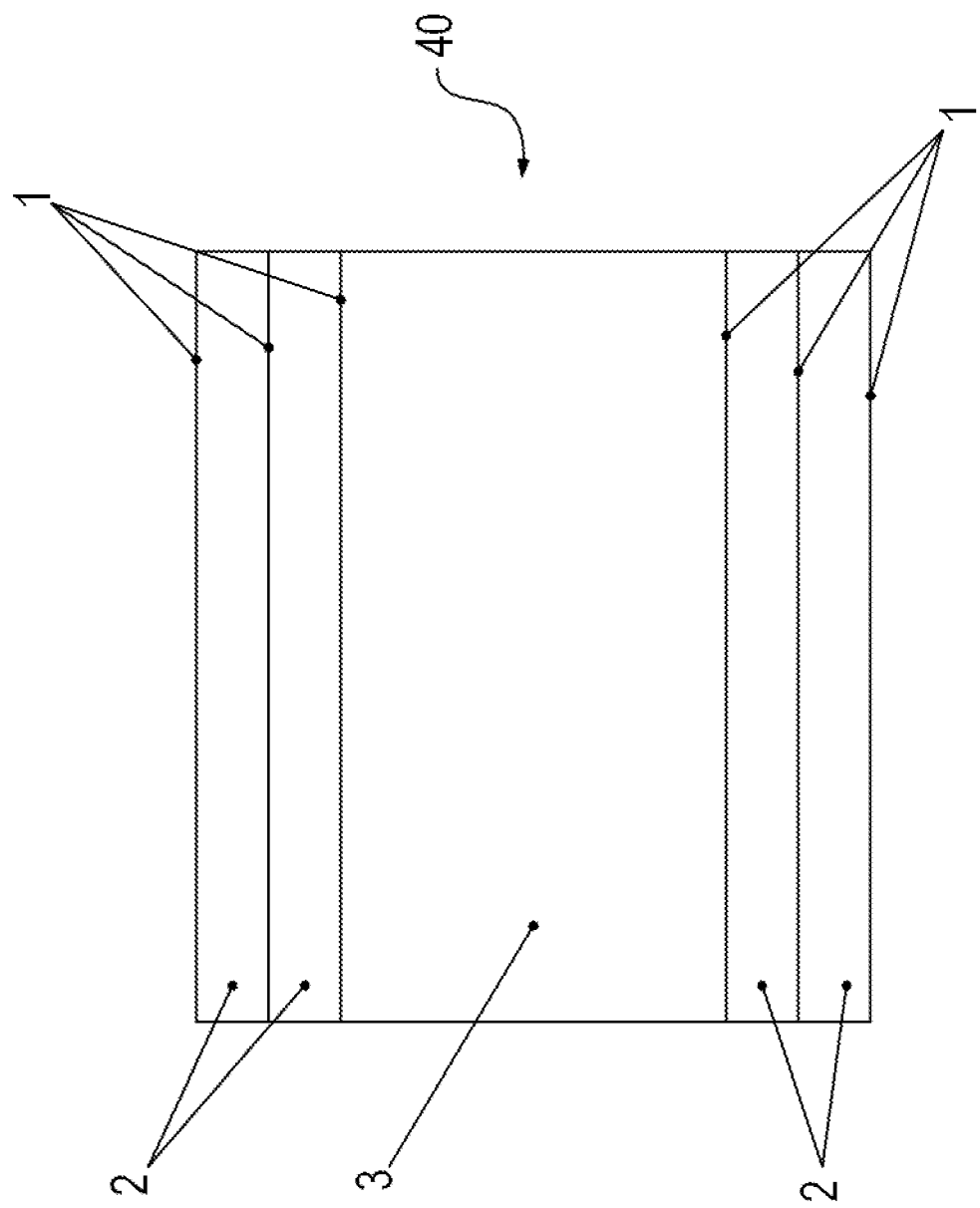
FIG. 1 is a schematic cross-sectional view of a first printed circuit board 40.
Figure 2:
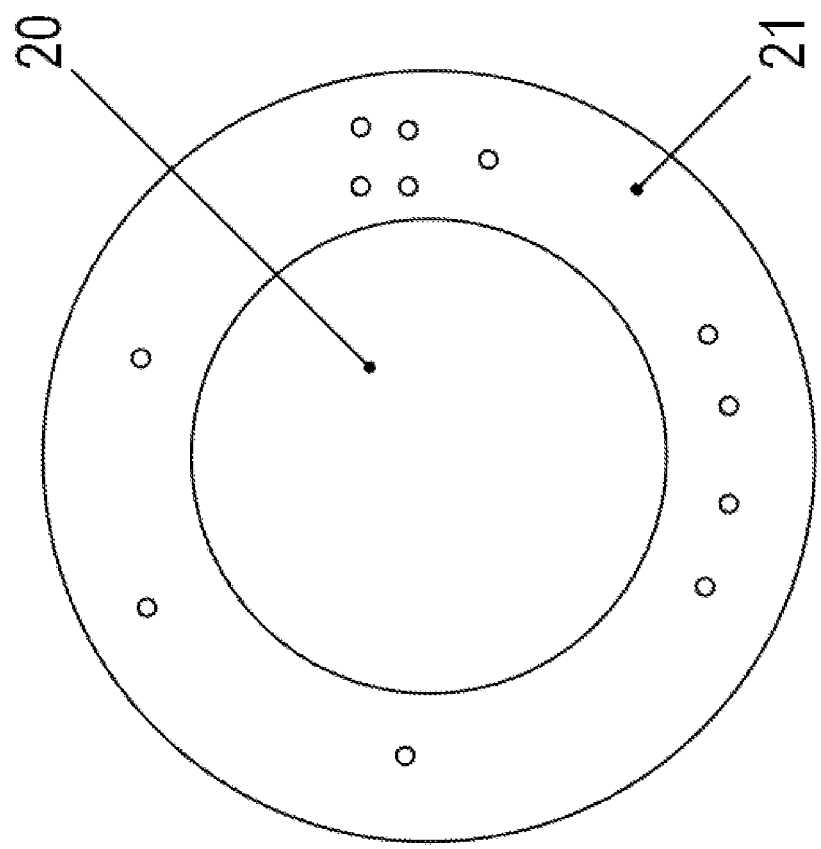
FIG. 2 is a schematic plan view of the first circuit board 40.

As shown in FIG. 2, the printed circuit board 40 has no vias in a central region 20, but only in an edge region 21 surrounding the central region 20. The vias arranged there are spaced irregularly from one another and impair the heat barrier effectiveness in the edge region.

Figure 3:
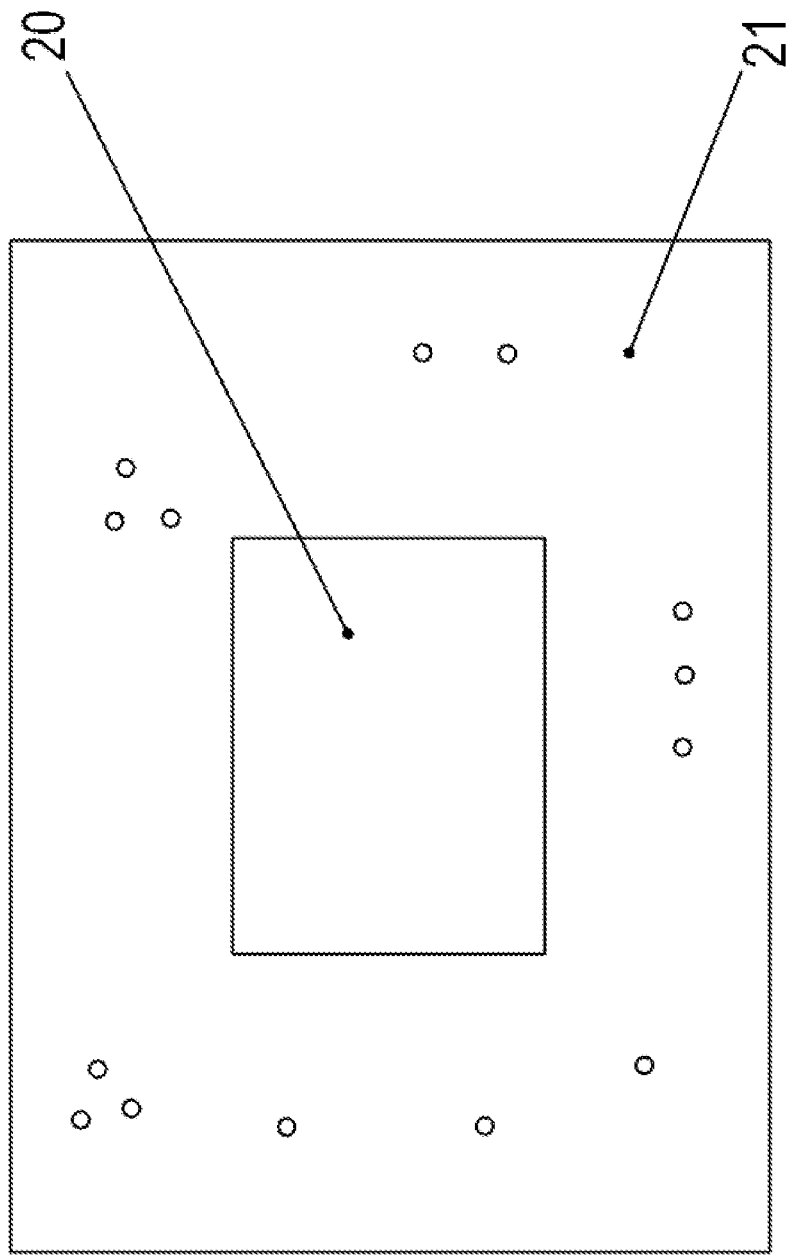
FIG. 3 is a schematic plan view of a first circuit board.

Instead of the circular configuration of the printed circuit board illustrated in FIG. 2, a rectangular printed circuit board 40 can also be used, as shown in FIG. 3.

The circuit board is arranged in an electric motor. If the electric motor has a cuboid exterior shape, the circuit board of FIG. 3 is used.

Figure 4:
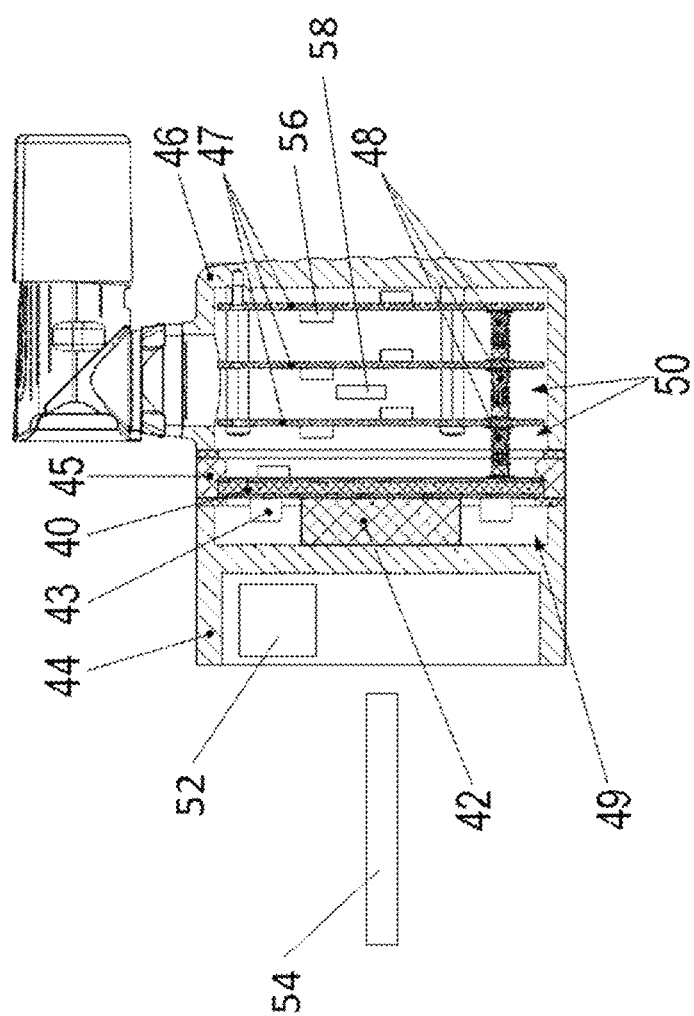
FIG. 4 is a cross-sectional view through an axial end region of an electric motor having a first circuit board 40.

As shown in FIG. 4, if the external shape of the electric motor is round, the printed circuit board 40 is configured according to FIG. 2.

The circuit board 40 is accommodated in a retaining ring 45 which is arranged between a stator housing 44 and a cover part 46 of the electric motor.

The stator of the electric motor is arranged inside the stator housing 44. On the B-side, on the stator housing 44, a spatial region for electronics is provided, which is surrounded by the stator housing 44, the retaining ring 45, and the cover part 46.

Second printed circuit boards 47, which are also provided with components, are also arranged in this space, together with the printed circuit board 40, which is the first printed circuit board.

The first printed circuit board 40 and the further printed circuit boards 47 are axially spaced apart and arranged parallel to one another.

The axial direction is parallel to the axis of rotation of the rotor shaft of the electric motor, which is arranged radially inside the stator.

The second printed circuit boards 47 are arranged on the side of the first printed circuit board 40 facing away from the stator housing 44.

The electronics include an inverter, whose controllable semiconductor switches are integrally arranged in a line module 42.

For cooling, the power module 42 is thermally conductively connected to the stator housing 44 on its side facing away from the first printed circuit board 40. The waste heat of the semiconductor switches, i.e., the power module, can thus be dissipated to the environment via the stator housing. However, the waste heat from the stator winding 52 of the electric motor is also dissipated to the environment via the stator housing.

The power module is mounted on the circuit board 40. On the same side of the printed circuit board 40, e.g., the side facing the stator housing 44, further components 43 are mounted, which can be operated at a first temperature.

On the other side of the first printed circuit board 40 and the second printed circuit boards 47, components 41, 56 are mounted, which can be operated up to a second temperature, which is however lower than the first temperature. The spatial region, i.e., these components, is cooled via the cover part 46.

The stator housing 44, the retaining ring 45, and the cover part 46 are each made of metal, e.g., as cast parts. The retaining ring 45 is sealingly connected both to the cover part 46 and to the stator housing part 44 by a respective intermediate seal.

The first circuit board 40 and the second circuit boards 47 are connected to their respective nearest neighbors by electrical connectors 48.

The second printed circuit boards 47 are spaced apart from one another by spacer bolts or spacer sleeves.

Figure 5:
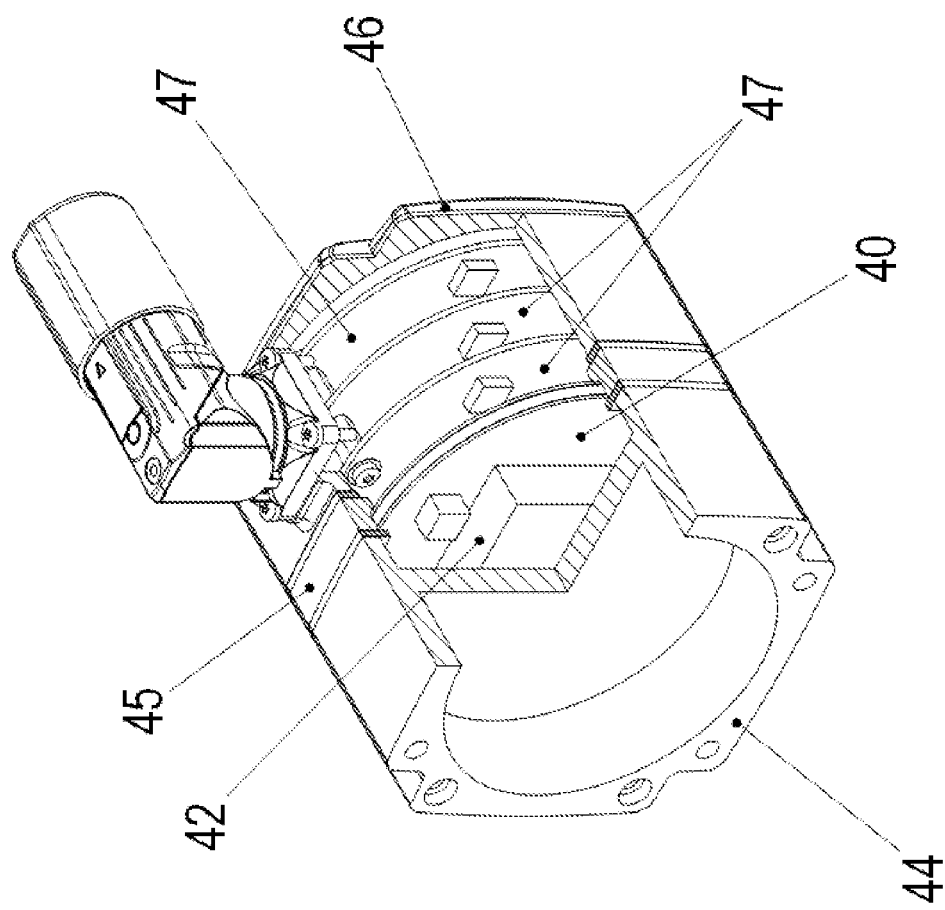
FIG. 5 is a perspective, partial cross-sectional of the end region, associated with FIG. 4.

FIG. 5 is a perspective, partial cross-sectional view associated with FIG. 4.

The seals between the parts forming the housing, i.e., between the stator housing 44, the retaining ring 45, and the cover part 46, also act as a thermal barrier, as does the insulating layer 3 of the printed circuit board 40. Thus, the B-side end region is thermally isolated from the rest of the motor region.

The normal direction of the circuit board plane is parallel to the axis of rotation of the rotor shaft 54.

According to exemplary embodiments, the retaining ring 45 can be arranged in two pieces or in several pieces instead of in one piece, in which case the pieces are connected to one another in a sealed manner, e.g., by a respective seal.

According to exemplary embodiments, a fan 58 is arranged within the spatial region. In this manner, air therein can be recirculated and thermal leveling can be achieved as a result.

For this purpose, the second circuit boards 47 have axially continuous recesses. These recesses are made sufficiently large so that the flow resistance is only insignificant. Each of the second printed circuit boards 47 has, for example, two recesses arranged diametrically opposite one another on the respective printed circuit board 47, so that ready circulation can be achieved.

The invention claimed is:

1. An electric motor, comprising:
   a first printed circuit board including layers having conductor tracks, the layers of the first printed circuit board being spaced apart from each other by first layers of insulating material, an insulating layer being arranged between two of the layers of the first printed circuit board;
   a stator housing accommodating a stator winding of the electric motor;
   a cover part; and
   a retaining ring arranged between the cover part and the stator housing and accommodating the first printed circuit board;
   wherein the retaining ring is sealed to the stator housing by an intermediate seal arranged as a thermal barrier, and/or the retaining ring is sealingly connected to the stator housing by an intermediate seal arranged as a thermal barrier.

2. The electric motor according to claim 1, wherein the insulating material includes a fiber-reinforced plastic and/or an epoxy material.

3. The electric motor according to claim 1, wherein a layer thickness of the insulating layer is greater than a layer thickness of the first layers.

4. The electric motor according to claim 1, wherein the insulating layer is made from a same material as the first layers.

5. The electric motor according to claim 4, wherein the first printed circuit board is arranged as a multilayered printed circuit board, the layers of the first printed circuit board being unevenly and/or irregularly spaced apart.

6. The electric motor according to claim 1, wherein the insulating layer is made of a different material than the first layers.

7. The electric motor according to claim 6, wherein the material of the insulating layer includes a plastic material.

8. An electric motor, comprising:
   a first printed circuit board including layers having conductor tracks, the layers of the first printed circuit board being spaced apart from each other by first layers of insulating material, an insulating layer being arranged between two of the layers of the first printed circuit board;
   wherein the insulating layer is made of a different material than the first layers;
   wherein the material of the insulating layer includes a plastic material; and
   wherein the plastic material includes enclosed gas bubbles and/or gas volumes.

9. The electric motor according to claim 8, further comprising:
   a stator housing accommodating a stator winding of the electric motor;
   a cover part; and
   a retaining ring arranged between the cover part and the stator housing and accommodating the first printed circuit board.

10. The electric motor according to claim 1, wherein the first printed circuit board and second printed circuit boards are arranged in a spatial region of the electric motor delimited and/or enclosed by the stator housing, the retaining ring, and the cover part.

11. The electric motor according to claim 10, wherein the first printed circuit boards and the second printed circuit boards are aligned parallel to one another and spaced apart from one another.

12. The electric motor according to claim 11, wherein an axis of rotation of a rotatably mounted rotor shaft of the electric motor is aligned parallel to a normal direction of the first printed circuit board.

13. The electric motor according to claim 10, wherein the second printed circuit boards are arranged on a side of the first printed circuit board facing away from the stator housing, and/or the first printed circuit board is arranged between the stator housing and the second printed circuit boards.

14. The electric motor according to claim 10, wherein a power module that is thermally conductively connected to the stator housing is mounted on a side of the first printed circuit board that faces the stator housing.

15. An electric motor, comprising:
   a first printed circuit board including layers having conductor tracks, the layers of the first printed circuit board being spaced apart from each other by first layers of insulating material, an insulating layer being arranged between two of the layers of the first printed circuit board;
   a stator housing accommodating a stator winding of the electric motor;
   a cover part; and a retaining ring arranged between the cover part and the stator housing and accommodating the first printed circuit board;

wherein the first printed circuit board and second printed circuit boards are arranged in a spatial region of the electric motor delimited and/or enclosed by the stator housing, the retaining ring, and the cover part;

wherein a power module that is thermally conductively connected to the stator housing is mounted on a side of the first printed circuit board that faces the stator housing; and wherein the power module and/or components mounted on the first printed circuit board on a side of the first printed circuit board facing the stator housing are operable up to a first temperature, components mounted on the first printed circuit board on a side of the first printed circuit board facing away from the stator housing and components mounted on the second printed circuit boards are operable up to a second temperature, and the second temperature is lower than the first temperature.

16. The electric motor according to claim 15, wherein the first temperature is a maximum permissible operating temperature of the power module, the second temperature is a maximum permissible operating temperature of the components mounted on the first printed circuit board and the components mounted on the second circuit boards, and the second temperature is lower than the first temperature by at least 10° C.

17. The electric motor according to claim 10, wherein the second printed circuit boards are accommodated in the cover part.

18. The electric motor according to claim 10, wherein the first printed circuit board is connected to the second printed circuit board closest to the first printed circuit board by an electrical plug connection, each second printed circuit board being connected to a next closest second printed circuit board by a respective electrical plug connection.

19. The electric motor according to claim 1, wherein the retaining ring is formed of one piece or of several pieces.

20. The electric motor according to claim 9, wherein the retaining ring is sealed to the stator housing by an intermediate seal arranged as a thermal barrier, and/or the retaining ring is sealingly connected to the stator housing by an intermediate seal arranged as a thermal barrier.

21. The electric motor according to claim 10, wherein a fan is arranged in the spatial region and/or each of the second printed circuit boards has two axially continuous recesses arranged diametrically opposite one another with respect to an axis of rotation of a rotor shaft of the electric motor.

22. The electric motor according to claim 1, wherein the stator housing, the retaining ring, and the cover part are made of metal and/or as cast parts.

23. The electric motor according to claim 1, wherein an outer side of the cover part includes cooling ribs.

* * * * *